US008157080B2

(12) United States Patent  (10) Patent No.: US 8,157,080 B2
Goodman  (45) Date of Patent: Apr. 17, 2012

(54) PRODUCT AGGREGATING APPARATUS

(75) Inventor: James A. Goodman, Highland Park, IL (US)

(73) Assignee: Pearson Packaging Systems, Spokane, WA (US)

(*) Notice: Subject to any disclaimer, the term of this patent is extended or adjusted under 35 U.S.C. 154(b) by 456 days.

(21) Appl. No.: 12/421,925

(22) Filed: Apr. 10, 2009

(65) Prior Publication Data

US 2010/0232924 A1    Sep. 16, 2010

Related U.S. Application Data

(60) Provisional application No. 61/159,642, filed on Mar. 12, 2009.

(51) Int. Cl.
*B65G 47/34* (2006.01)
(52) U.S. Cl. ............ 198/369.2; 198/435; 198/431; 198/429; 53/445; 53/154
(58) Field of Classification Search ............ 198/369.2, 198/429, 430, 431, 435; 53/445, 154, 155
See application file for complete search history.

(56) References Cited

U.S. PATENT DOCUMENTS

| 3,360,100 | A | * | 12/1967 | Seragnoli | 198/347.3 |
| 3,499,555 | A | * | 3/1970 | Wahle | 198/347.3 |
| 6,164,045 | A | * | 12/2000 | Focke et al. | 53/543 |
| 6,297,721 | B1 | * | 10/2001 | Lu et al. | 336/96 |
| 2001/0029723 | A1 | | 10/2001 | Ziegler et al. | |
| 2003/0057058 | A1 | * | 3/2003 | Iwasa | 198/419.3 |
| 2009/0107801 | A1 | * | 4/2009 | Smith | 198/369.2 |
| 2010/0108464 | A1 | * | 5/2010 | Davi et al. | 198/347.1 |

FOREIGN PATENT DOCUMENTS

| EP | 0561098 A1 | 9/1993 |
| EP | 10230909 A | 9/1998 |

* cited by examiner

*Primary Examiner* — Mark A Deuble
(74) *Attorney, Agent, or Firm* — Lee & Hayes, PLLC

(57) ABSTRACT

A product aggregating apparatus receives product with an in-feed conveyor assembly and provides the product in an aggregated, registered and/or organized form, such as to a product picking apparatus. The in-feed conveyor assembly includes at least one in-feed conveyor, each in-feed conveyor configured to deliver product to first and second locations. A product receiver assembly includes at least first and second product receiver carriages to receive product at the first and second locations, respectively. An aggregated product receiver assembly comprises a carriage configured for vertical movement to positions adjacent to each product receiver carriage. A pusher assembly, comprising a pusher carriage configured for vertical movement to positions adjacent to each product receiver carriage, contains pushers horizontally moveable to push product from the adjacent product receiver carriage and onto the carriage of the aggregated product receiver assembly for picking by an appropriate apparatus.

16 Claims, 11 Drawing Sheets

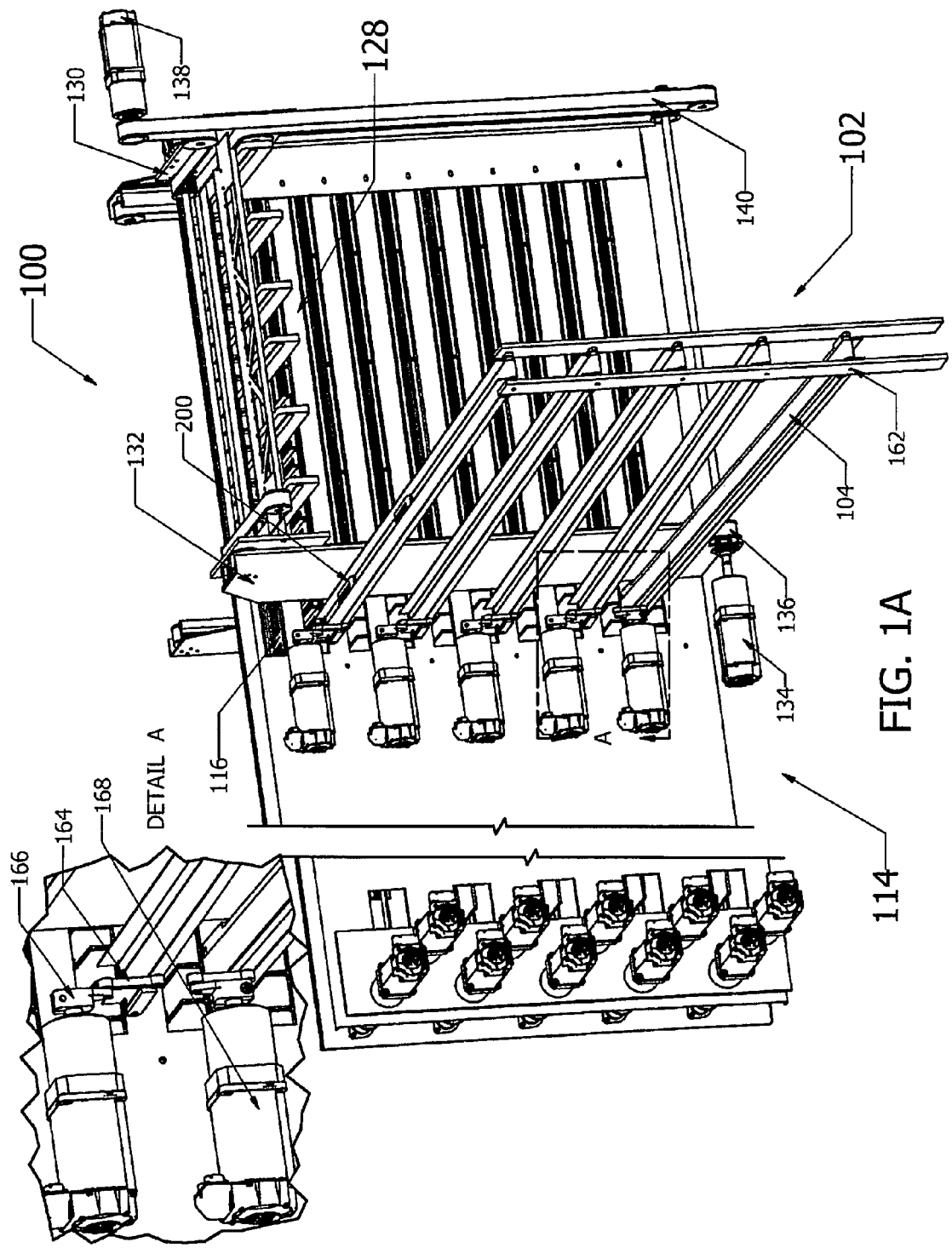

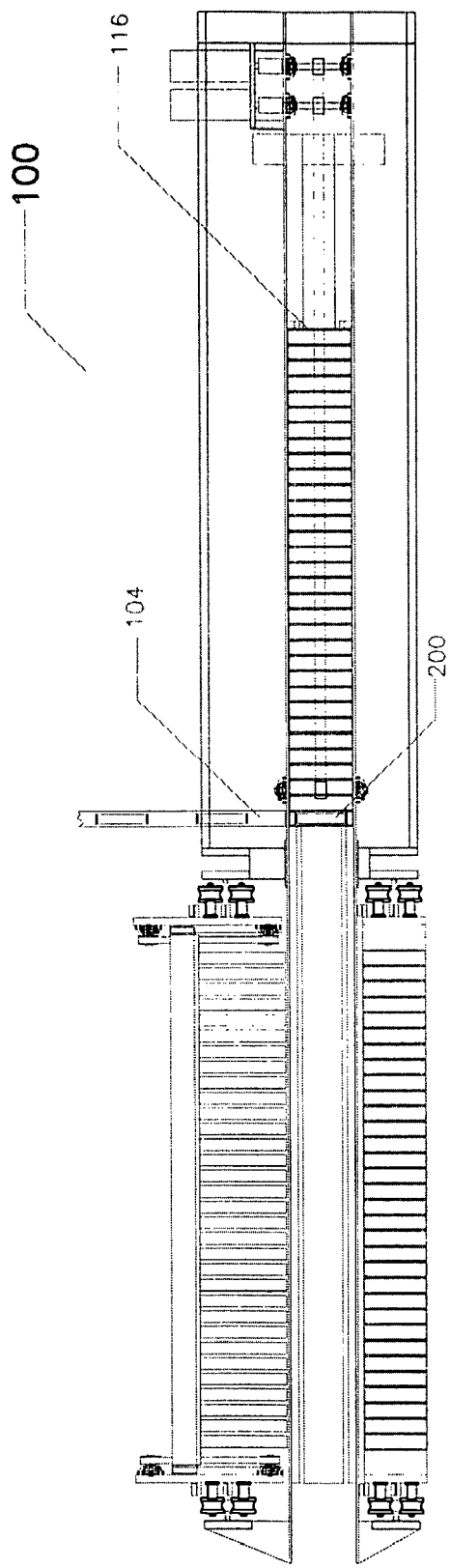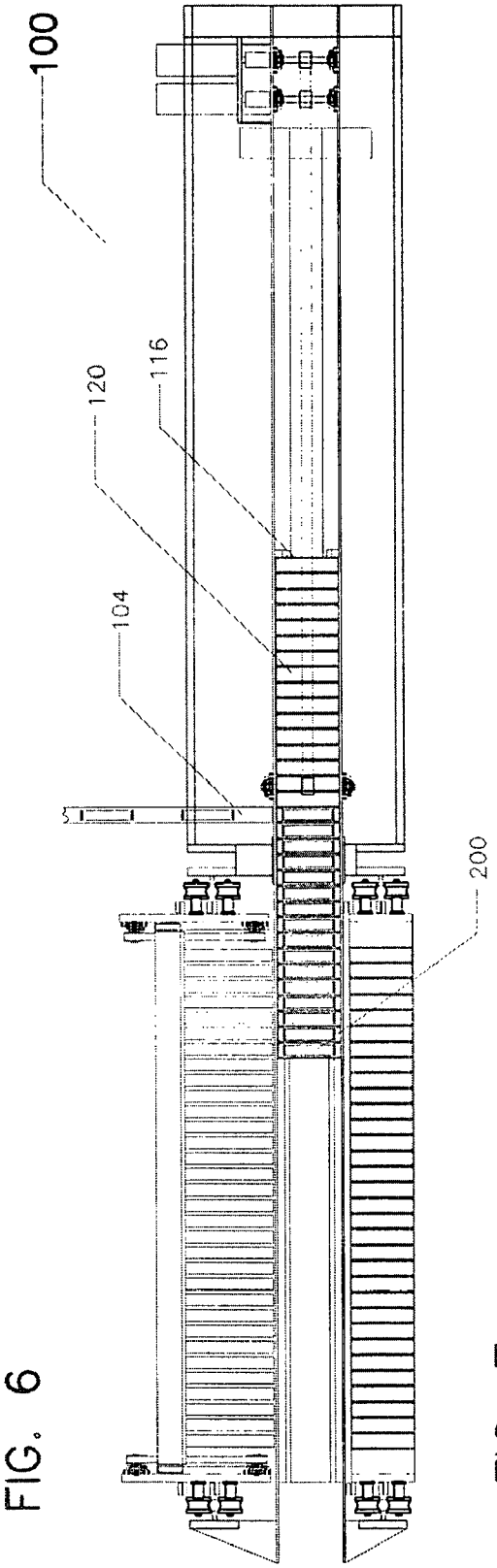
FIG. 6
FIG. 7

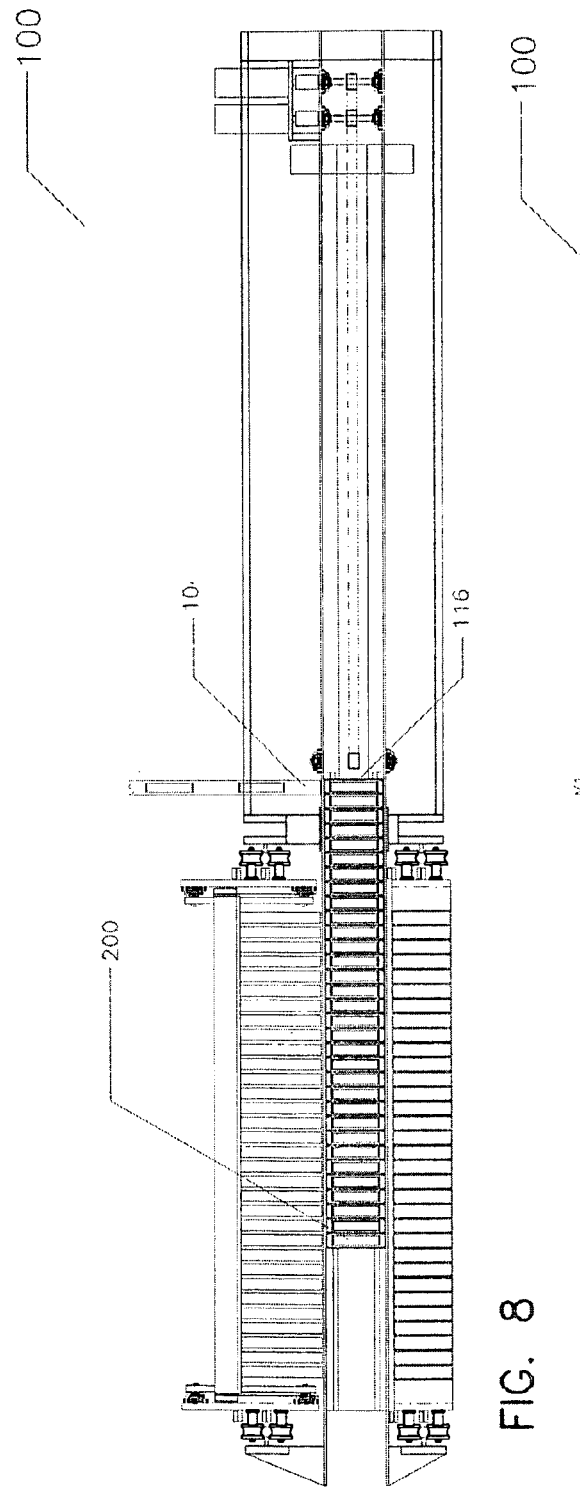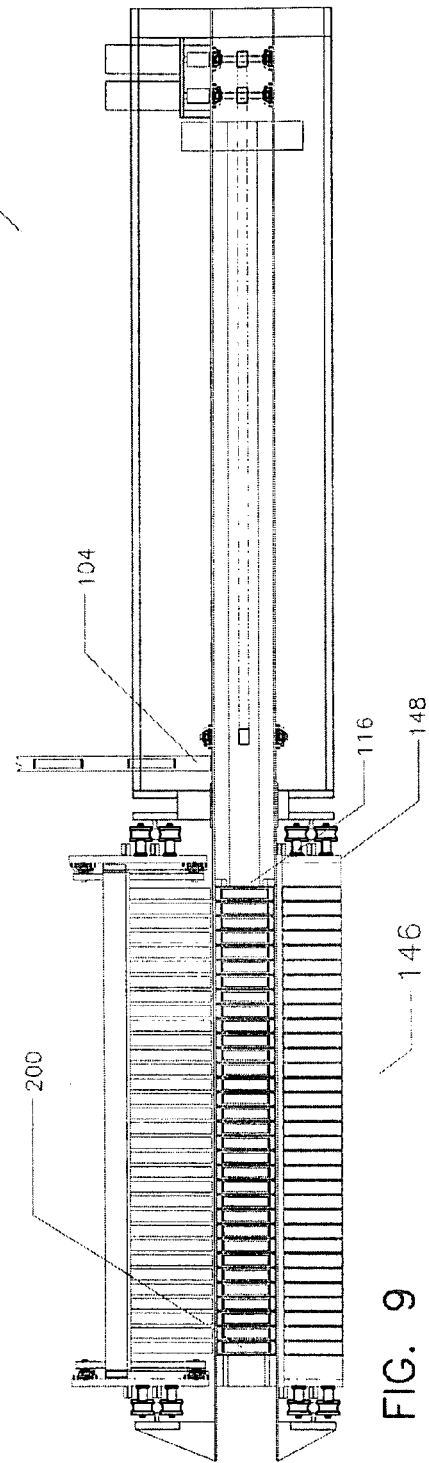

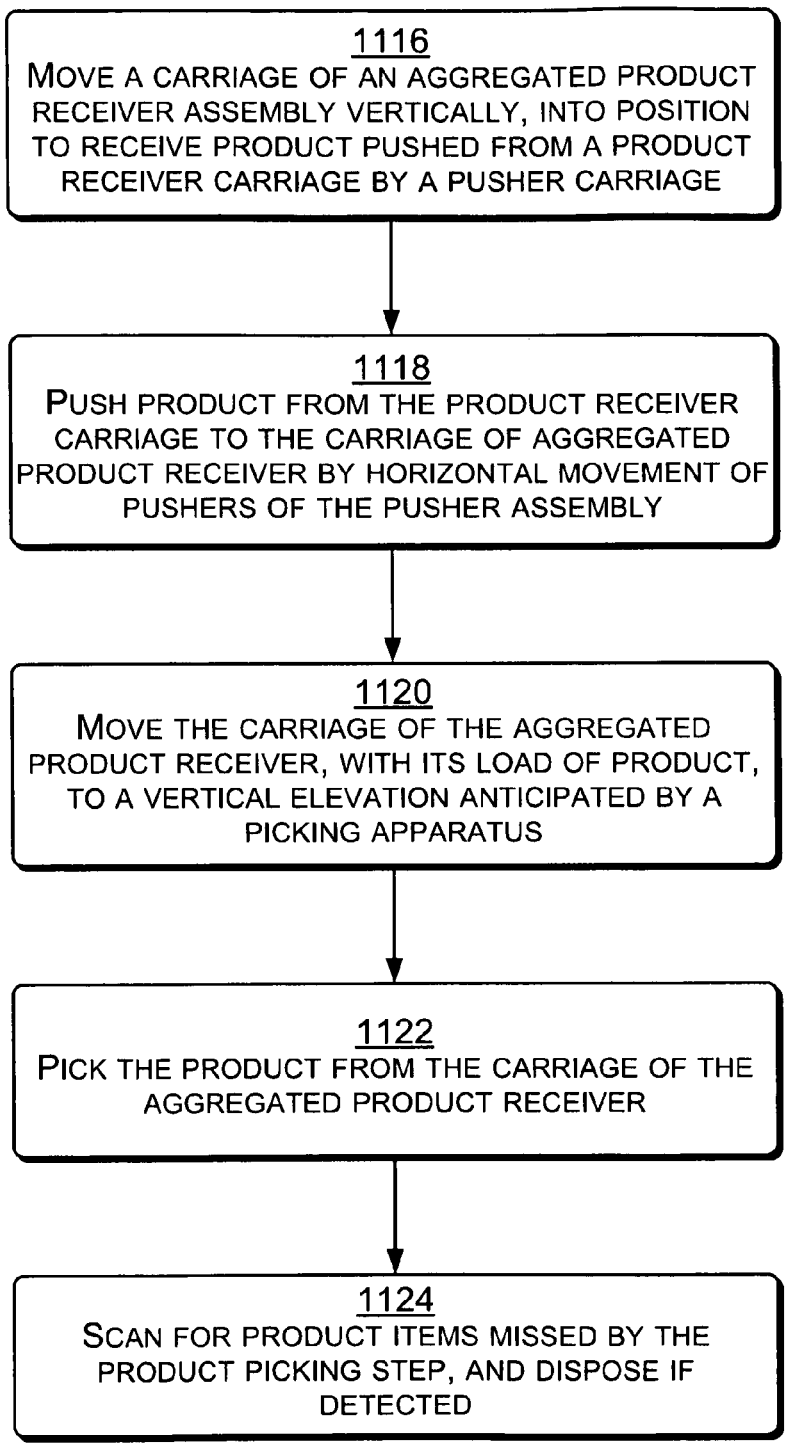
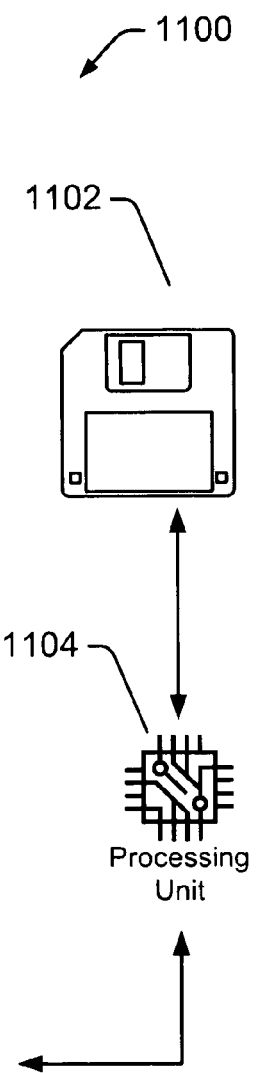
Fig. 11B

PRODUCT AGGREGATING APPARATUS

RELATED APPLICATIONS

This application claims priority to, and hereby incorporates by reference herein, a provisional application filed Mar. 12, 2009, having Ser. No. 61/159,642.

BACKGROUND

In an automated product packaging environment, items of product can be grouped for packaging by operation of a product aggregating apparatus. Such a product aggregating apparatus provides aggregated product—wherein product items are grouped in an expected manner—to any of a variety of product picking devices. In a typical application, a product aggregating apparatus is configured to receive an input including a plurality of product items from one or more conveyors, to deposit each of the product items into an array of receptacles, to pick the product items from the receptacles, and to place the items in a carton, case or other packaging.

A problem results when a rate of in-coming product delivered by the conveyors is sufficiently high, and the array of deposited product items must be expanded to accommodate the delivered product. In such a circumstance, the product picking and placing apparatus must move over considerable distance to pick product and deposit the picked product in packaging. This can result in a bottleneck that can slow the product aggregating apparatus and the entire automated product packaging process.

Accordingly, a need exists for product aggregating apparatus having a design that is better adapted for high speed operation.

SUMMARY

A product aggregating apparatus receives product with an in-feed conveyor assembly and provides the product in an aggregated form, such as to a product picking apparatus. The in-feed conveyor assembly includes at least one in-feed conveyor, each in-feed conveyor articulated to allow it to deliver product items to at least two product receiver carriages within a product receiver assembly. The product receiver carriages within the product receiver assembly are stacked in a vertical relationship. In operation, an in-feed conveyor articulates to a first position to deliver product to a first product receiver carriage until that carriage has received an appropriate number of product items. The in-feed conveyor then articulates to a second position to deliver product to a second product receiver carriage within the product receiver carriage assembly. As product is delivered to the second product receiver carriage, product is removed from the first product receiver carriage, and the reverse. An aggregated product receiver assembly receives product removed from the product receiver carriages in the product receiver carriage assembly, typically in the order in which the product receiver carriages were filled. The aggregated product receiver assembly comprises a carriage configured for vertical movement to positions adjacent to each product receiver carriage within the product receiver assembly. A pusher assembly includes a pusher carriage configured for vertical movement within a framework. In operation, the pusher carriage moves to a position adjacent to a product receiver carriage to be emptied. A pusher then moves horizontally from the pusher carriage to push product from the adjacent product receiver carriage and onto the carriage of the aggregated product receiver assembly. The aggregated product receiver assembly is moved vertically to an expected location, and a picker apparatus removes the aggregated product.

This Summary is provided to introduce a selection of concepts in a simplified form that are further described below in the Detailed Description. This Summary is not intended to identify key features or essential features of the claimed subject matter, nor is it intended to be used to define, limit or aid in the interpretation of the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 1A is an isometric view of an example of a product aggregating apparatus constructed according to the teachings herein, wherein in-feed conveyors move vertically to deliver product to two vertically stacked receiver carriages.

FIG. 6 is an orthographic view of the product aggregating apparatus, showing a product receiver carriage having received a single product item from an in-feed conveyor.

FIG. 7 is an orthographic view showing the product aggregating apparatus of FIG. 6 at a somewhat later time, wherein the product receiver carriage is half full of product items, wherein each item was received in sequence from the in-feed conveyor.

FIG. 8 is an orthographic view showing the product aggregating apparatus of FIG. 7 at a still later time, wherein the receiver carriage is now full of product items received in sequence from the in-feed conveyor.

FIG. 9 is an orthographic view showing the product aggregating apparatus of FIG. 8 at a still later time, wherein the product receiver carriage has moved to a transfer position, from which location product will be transferred from the product receiver carriage to the carriage of an aggregated product receiver assembly, typically after earlier-filled product receiver carriages and before later-filled product receiver carriages.

FIGS. 11A and 11B are a flowchart, describing operation of one example of a product aggregating apparatus.

DETAILED DESCRIPTION

Overview

Figure 1B:
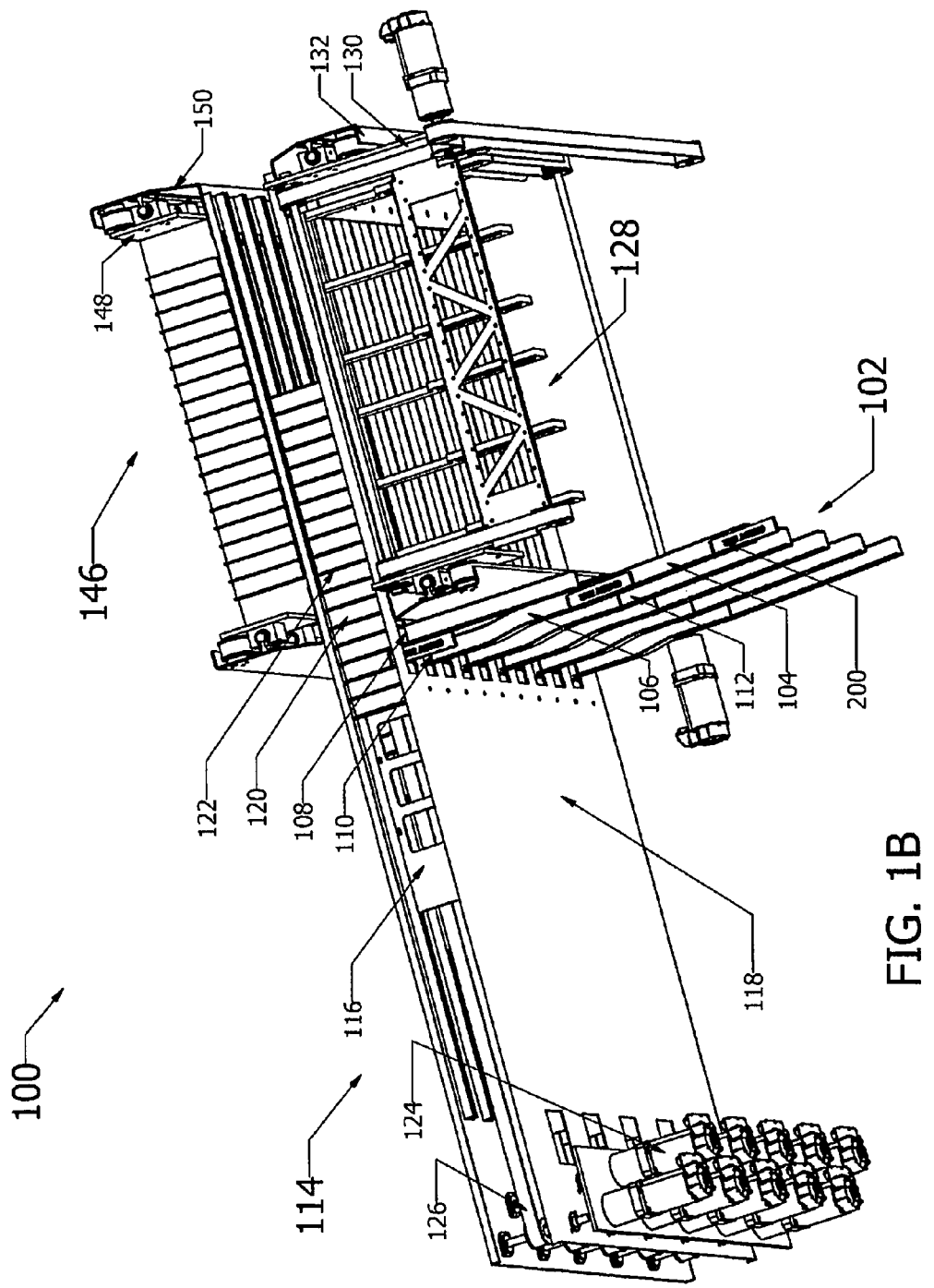
FIG. 1B is an isometric view of an example of a product aggregating apparatus, showing an in-feed conveyor having an alternative structure to that of FIG. 1A.

The discussion herein is directed to examples of a product aggregating apparatus and method by which such equipment is operated. Thus, the discussion teaches new technology of general application and utility by reference to specific descriptions and examples. The product aggregated by the product aggregating apparatus can be any product, such commercially available products, and is typically product that is aggregated into groups of a fixed number for packaging in a common box, case, container or other packaging. For example, a number (e.g. 12, 24, 48 or alternative number) of items (e.g. food products, toys, office supplies, car parts, or anything else) can be aggregated for transfer to one or more cases.

This document uses the term "aggregating" to indicate that individual product items are being combined, amassed, collected, moved or otherwise rearranged physically with respect to each. One example of product aggregating, if the product is candy bars, would be to receive an input of candy bars moving along one or more conveyors in single file, and to produce an output of product aggregated so that 6, 12, 24 or 48, etc. candy bars are arranged side-by-side. In such a side-by-side orientation, each candy bar would be oriented with the same narrow end (e.g. the "right end" as indicated by printing of the wrapper) pointed forward, the same narrow end pointed backward (e.g. the "left end"), with similar spacing between all candy bars, and so that imaginary lines passing through the forward and rearward ends of all the candy bars would be straight and parallel.

In one version of the technology taught herein, individual product items are moved along a product in-feed conveyor that feeds into the product aggregating apparatus. A product in-feed conveyor assembly may include a plurality of such in-feed conveyors. Each in-feed conveyor device is articulated to allow product delivery to at least two product receiver carriages. The in-feed product conveyor delivers product to a first product receiver carriage until that carriage is full. At that time, the in-feed conveyor articulates (i.e. moves to change the point to which the product conveyed is delivered) to deliver a similar number of product items into a second product receiver carriage. Thus, by alternately delivering product to at least two different product receiver carriages, each in-feed conveyor within the in-feed conveyor assembly fills a first product receiver carriage with product while the second product receiver carriage is emptied, and the reverse.

A plurality of product receiver carriages is typically associated with a plurality of in-feed conveyors. In a typical association, two product receiver carriages of a product receiver assembly are associated with one in-feed conveyor of an in-feed conveyor assembly. Thus, product from an in-feed conveyor is delivered to a first product receiver carriage while a second product receiver carriage is emptied, and the reverse.

In a typical application, the product receiver assembly (comprising a plurality of product receiver carriages, each with a drive motor, drive belts, a supporting framework, etc.) is configured in a vertically stacked relationship. Each product receiver carriage, once full of product, is emptied into an aggregated product carriage of an aggregated product receiver assembly. That is, each product receiver carriage receives individual product items repeatedly, and when full, transfers the aggregated product to the carriage of the aggregated product receiver assembly. The product receiver carriages are typically emptied into the aggregated product receiver assembly in a first-to-be-filled, first-to-be-emptied manner. The carriage of the aggregated product receiver assembly is moved vertically to successively accept the aggregated product from a sequence of product receiver carriages. That is, the carriage of the aggregated product receiver assembly moves to a vertical elevation of a product receiver carriage having a full load of product. Extension of a pushing device of a product pusher assembly moves the product from the product receiver carriage to the carriage of the aggregated product receiver assembly. Once in the carriage of the aggregated product receiver assembly, the product is aggregated in a uniform manner. For example, lines directed through left and right ends of the product items, respectively, would be straight and parallel. After receiving a load of product, the carriage of the aggregated product receiver assembly moves to a selected position, at which location a picking apparatus removes the aggregated product (typically to be deposited within a case, carton or other container). The selected position can be based on convenience to the carriage of the aggregated product receiver assembly, convenience to the product picker apparatus removing product from the carriage of the aggregated product receiver assembly, or on other factors.

Example Apparatus

FIG. 1A shows an example of a product aggregating apparatus 100. An in-feed conveyor assembly 102 receives product into the apparatus 100 and moves it within the apparatus, such as to a product receiver assembly 114. The in-feed conveyor assembly 102 may include a plurality of in-feed conveyors 104. Each in-feed conveyor 104 is able to deliver product items to at least two locations, each location associated with a product receiver carriage 116 (better seen in FIG. 1B) of the product receiver assembly 114. In the example of FIG. 1A, each in-feed conveyor 104 articulates at a hinge 162, which gently changes the angle of the in-feed conveyor 104 to position it so that it can deliver product to either of two product receiver carriages 116. Accordingly, each in-feed conveyor 104 is able to fill product item locations 120 (seen in FIG. 1B) in a first product receiver carriage 116 with a plurality of product items, to pivot slightly about hinge 162 to orient the in-feed conveyor 104 to a second product receiver carriage 116, and then to fill product item locations of the second product receiver carriage with product items while the first product receiver carriage is emptied. Note that while in the below discussion, one in-feed conveyor is associated with two product receiver carriages, that this is illustrative of the general concept, and that one in-feed conveyor could alternatively be associated with three or more product receiver carriages.

Each in-feed conveyor 104 is held or supported by a support 164, which may be carried by a rotary device, such as a wheel or crank 166. Rotation of the rotary device changes the in-feed conveyor between its first and second product delivery locations, locations associated with product delivery to that in-feed conveyor's upper and lower product receiver carriages 116. Thus, rotation of the wheel or crank 166 raises or lowers the support 164 and its supported in-feed conveyor 104 so that the conveyor will fill either the upper or lower product receiver carriage 116. By rotating the crank 166 after one product receiver carriage 116 is filled, product items may be sent by the in-feed conveyor 104 to a second product receiver carriage within the product receiver assembly 114.

The wheel or crank 166 can be rotated between a first position, wherein product items are delivered to a first product receiver carriage 116, and a second position, wherein product items are delivered to a second product receiver carriage 116, by operation of a motor 168. The motor can be controlled by a computer, a processor, appropriate programming and/or a controller circuit seen in a unified device at 1104 and associated memory device 1102 (shown in FIG. 11).

Each in-feed conveyor 104 within the in-feed conveyor assembly 102 can be configured to deliver product items 200 at different rates. This can be a function of a different conveyor speed, different spacing between the product items, or a combination of both. When two in-feed conveyors are operating to deliver product items at different speeds, the two product receiver carriages 116 associated with each in-feed conveyor will also operate at different speeds. That is, each pair of product receiver carriages 116 will operate at a speed required to receive the product transmitted by the in-feed conveyor 104 associated with that pair of product receiver carriages. In one example, if a first in-feed conveyor operates to deliver product items at a high rate of speed, then the two product receiver carriages associated with that in-feed conveyor will also operate rapidly to process the received items. In contrast, a second in-feed conveyor, within the same in-feed conveyor assembly, may operate to deliver product at a slower rate of speed and be associated with two product receiver carriages that, as a result, operated more slowly to process the received items.

FIG. 1B shows a second example of a product aggregating apparatus 100, having an in-feed conveyor assembly 102 with a structural alternative to that seen in FIG. 1A. Other aspects of the product aggregating apparatus 100 of FIGS. 1A and 1B are the same. As in FIG. 1A, the in-feed conveyor assembly 102 of FIG. 1B receives product into the apparatus 100 and includes a plurality of in-feed conveyors 104. However, the in-feed conveyors 104 of FIG. 1B deliver product through a bifurcated conveyor-end device 106. The bi-furcated conveyor-end device allows each in-feed conveyor 104 to deliver product to two alternative locations through each of first and second conveyor ends 108, 110. For example, a certain number of product items can to be delivered by an in-feed conveyor 104 through a first conveyor end 108 to a first product receiver carriage 116. After the number of product items is delivered by the first conveyor end 108, a diverter device 112 diverts product travel from the first conveyor end 108 and to a second conveyor end 110 to fill a second product receiver carriage. The diverter 112 can be a paddle, flipper or other device which changes the direction of product movement to switch between the conveyor ends 108, 110. Accordingly, after action of the diverter device 112, a certain number of product items would be delivered by the in-feed conveyor 104 through a second conveyor end 110.

Continuing to refer to FIG. 1B, a product receiver assembly 114 receives product from the conveyor assembly 102. In particular, each product receiver carriage 116 of the product receiver assembly 114 receives product from an in-feed conveyor 104 of the conveyor assembly 102. The product receiver assembly 114 includes at least two product receiver carriages 116 supported within a product receiver assembly framework 118. The product receiver carriages 116 are supported in a vertically stacked relationship or array by the framework 118. In the product aggregating apparatus 100 of FIG. 1B, the product receiver assembly 114 includes two product receiver carriages 116 for each in-feed conveyor assembly 102. In the implementation of FIG. 1B, each product receiver carriage 116 is filled by one conveyor end 108 of an in-feed conveyor 104, while an adjacent product receiver carriage, which has already been filed by the other conveyor end 110 of the in-feed conveyor, is emptied into an aggregated product receiver assembly, as will be discussed below.

The product receiver carriages 116 are configured for horizontal movement. Horizontal movement in a first direction allows product to be placed onto each of a succession of product item holders or locations 120 of the carriage 116, as those locations pass adjacent to an end of an in-feed conveyor. After product item locations 120 of a product receiver carriage 116 are filled, the carriage is moved horizontally to a transfer position, wherein the product is transferred from the product receiver carriage to a carriage 148 of an aggregated product receiver assembly 146. After the product is transferred, the carriage 116 is moved horizontally in the second direction, to thereby reposition the carriage to repeat the process performed in the first direction. In the implementation of FIG. 1B, the product items 200 are removed from product item locations 120 of the carriage 116 prior to retraction in the second direction. Alternatively, the transfer position could be located in the second direction from a location of the carriage upon receiving its last product item after moving in a first direction.

Horizontal movement of each product receiver carriage 116 repeatedly allows one product item location or holder 120 defined on the product receiver carriage to be positioned to receive a product item from a conveyor 104. As the product receiver carriage 116 is moved in the first direction, each product holder location 120 is momentarily located adjacent to a conveyor end, at which time the location is filled with a product item. For example, a product receiver carriage 116 may move smoothly, or may move in a pulsing step motion, to repeatedly position one holder location 120 after another in position to receive a product item from a first conveyor end 108. The product holder locations 120 of each product receiver carriage 116 are separated by walls 122, which define holder locations that are appropriately sized for the product to be received. As this is happening, an adjacent receiver carriage, already filled with product by an adjacent second conveyor end 110 is in the process of being emptied and/or waiting to be emptied, as will be discussed below.

Thus, each in-feed conveyor 104 within the in-feed conveyor assembly 102 is associated with two product receiver carriages 116. Once a first of the two product receiver carriages 116 is filled with product items, the in-feed conveyor 104 begins to fill the second product receiver carriage. FIGS. 1A and 1B show two different structures of in-feed conveyors 104, each of which is able to deliver product to two different product receiver carriages 116. As the second product receiver carriage 116 is being filled by the in-feed conveyor 104, the first product receiver carriage must be emptied by action of the pusher assembly 128 (FIG. 1B), which off-loads product to a carriage 148 (FIG. 1B) of the aggregated product receiver assembly 146 (FIG. 1B). Thus, the pusher assembly 128 (FIG. 1A) and aggregated product receiver assembly 146 (FIG. 1B) must be able to remove product from all product receiver carriages filled before the first product receiver carriage was filled, and empty the first product receiver carriage, while the second product receiver carriage is being filled.

Each product receiver carriage 116 is moved horizontally by a drive motor 124 and associated drive belt 126. In a typical application, the motor 124 and belt 126 advances the carriage 116 one step at a time, as each holder location 120 is filled in sequence. Motor 124 is a servo motor; however, stepper motors or any alternative motor type that is indicated for an application could be substituted. After the holder locations 120 are filled, the carriage 116 is advanced to a location at which it is emptied of product. After the carriage 116 is emptied, the motor 124 and belt drive 126 retract the carriage to a starting position from which it is again filled. In an alternative structure and method of operation, the carriage 116 may be withdrawn and then emptied.

Continuing to refer to FIG. 1B, portions of a pusher assembly 128 are seen. The pusher assembly is configured to push product from a product receiver carriage 116 and onto a carriage 148 of an aggregated product receiver assembly 146. In the implementation of FIG. 1B, a pusher carriage 130 is configured for vertical movement within a framework 132, to thereby position the carriage adjacent to a product receiver carriage to be emptied. Once so positioned, pushers 142 (seen in FIG. 4) extend horizontally into or through the holders 120 of the product receiver carriage 116 to push product from a product receiver carriage and onto the aggregated product receiver carriage 148.

Referring to FIG. 1A, a vertical height adjustment motor 134 and associated drive belt 136 moves the pusher carriage 130 up and down within the framework 132. By moving up and down within the framework 132, the pusher carriage 130 may be moved to the elevation of any product receiver carriage 116 (better seen in FIG. 2B) in the product receiver assembly 114. Once at that elevation, the pusher carriage 130 is in position move pushers 142 (seen in FIG. 4) horizontally to push product items from the product receiver carriage 116 and onto the carriage 148 (FIG. 1B) of the aggregated product receiver assembly 146 (FIG. 1B). That is, the product receiver assembly 114 includes a number of product receiver carriages 116, each of which is at a fixed elevation. Typically, product from each product receiver carriage 116 is removed in the order in which the carriages 116 became full of product. After each product receiver carriage 116 is filled with product, and that carriage moved horizontally to the removal location, the pusher carriage 130 of the pusher assembly 128 moves to the fixed elevation of that product receiver carriage to push the product off that product receiver carriage by horizontal movement of the pushers 142 (seen in FIG. 4).

Figure 4:
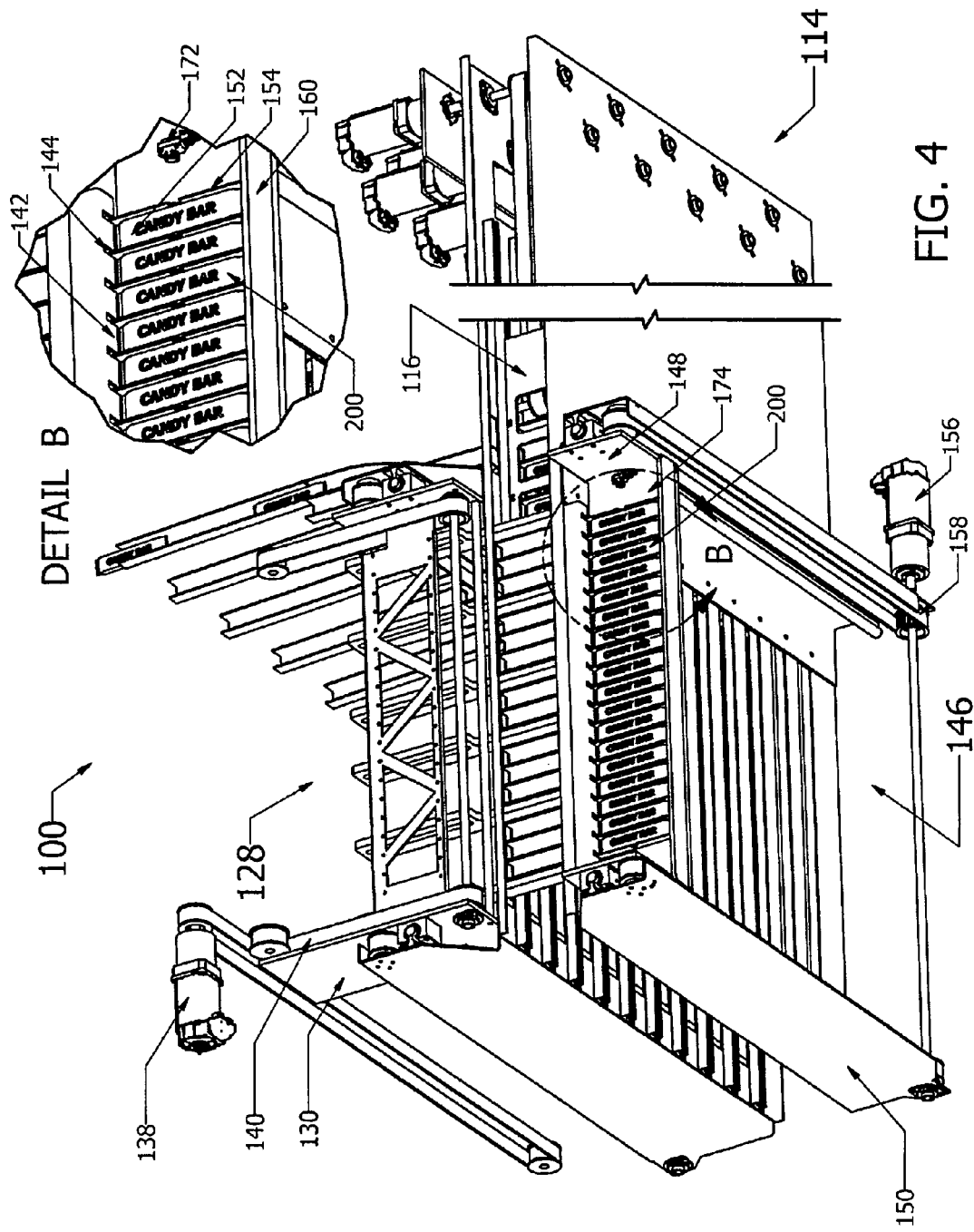
FIG. 4 is an isometric view of the product aggregating apparatus, wherein a load of product has been moved from the product receiver carriage to the aggregated product receiver carriage of the aggregated product receiver assembly.

FIGS. 1B and 4 collectively show structures within the pusher assembly 128 and aggregated product receiver assembly 146. After moving to a correct vertical location to push product off a full product receiver carriage 116, a horizontal drive motor 138 and associated drive belt 140 move the pushers or plungers 142 of the pusher carriage 130 in a horizontal manner to push product from the product receiver carriage 116 and onto a carriage 148 of an aggregated product receiver assembly 146. The pusher carriage 130 includes a plurality of plungers or pushers 142 that pass through or into the product item locations (holders) 120 of the product receiver carriage 116. Accordingly, spaces or slots 144 between pushers 142 are incrementally larger than the walls 122 between product item holders 120. Thus, the slots 144 move over the walls 122 as the pushers 142 push product from the product receiver carriage 116 and into the carriage 148 of the aggregated product receiver assembly 146. The product moves until it hits a stop 160, which prevents continued movement. As a result of the stop 160, a forward end of each product item is similarly extended, and imaginary lines going through a forward and a rearward end of each product item are straight and parallel. Thus, the product has been "registered" and/or "aggregated" in a desired manner.

Referring again to FIGS. 1B and 4, an aggregated product receiver assembly 146 is configured to receive product from a product receiver carriage 116 that has been filled with product. In particular, the product items are pushed, by the pushers or plungers 142 of the pusher carriage 130 of the pusher assembly 128, from one of the product receiver carriages 116 of the product receiver assembly 114 and onto the carriage 148 of the aggregated product receiver assembly 146.

FIG. 4 shows portions of the aggregated product receiver assembly 146, including the aggregated product receiver carriage 148 and portions of the framework 150 which supports the carriage 148 for vertical movement. In operation, the aggregated product receiver carriage 148 moves to an elevation associated with a product receiver carriage 116 to be emptied. The pusher carriage 130 of the pusher assembly 128 arrives at that elevation, and pushers or plungers 142 (as seen in FIG. 4 Detail B) push product off the product receiver carriage 116 and onto the aggregated product receiver carriage 148 of the aggregated product receiver assembly 146. The aggregated product receiver carriage 148 then moves to an elevation at which a product picker (not shown) removes the product. The aggregated product receiver carriage 148 then moves to another elevation to receive additional product from another product receiver carriage.

Figure 2:
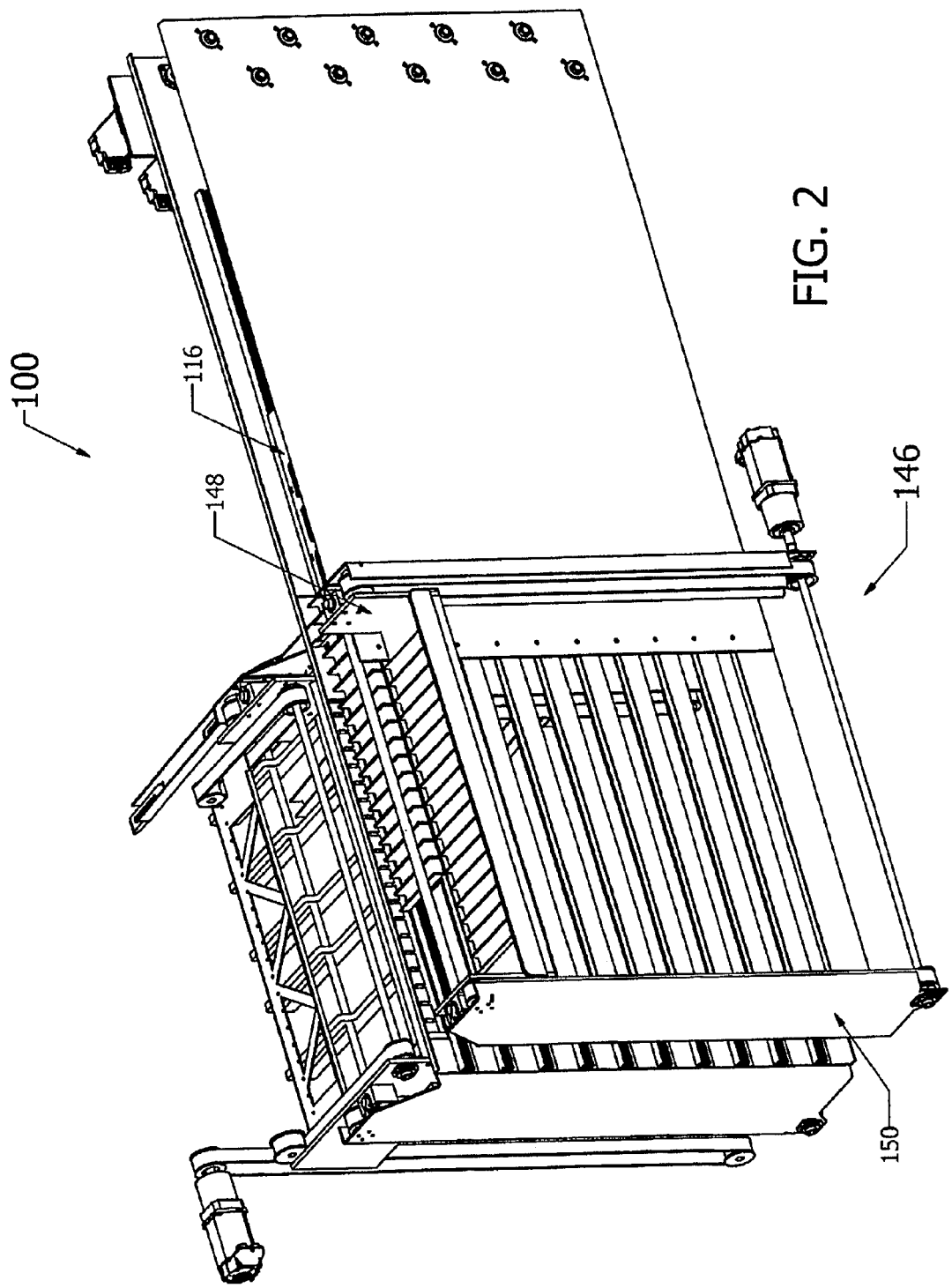
FIG. 2 is an isometric view of the product aggregating apparatus, wherein the aggregated product carriage is oriented toward the front of the view.

FIG. 2 shows additional detail of the aggregated product receiver assembly 146. In this view, the carriage 148 is seen in an elevated location within the framework 150, i.e. a location that is as far up as it is designed to go, and at a position wherein it is able to receive product from an upper product receiver carriage 116. Note that that a product receiver carriage 116 is in an intermediate location, in that it is not fully withdrawn or fully extended in the horizontal direction.

Figure 3:
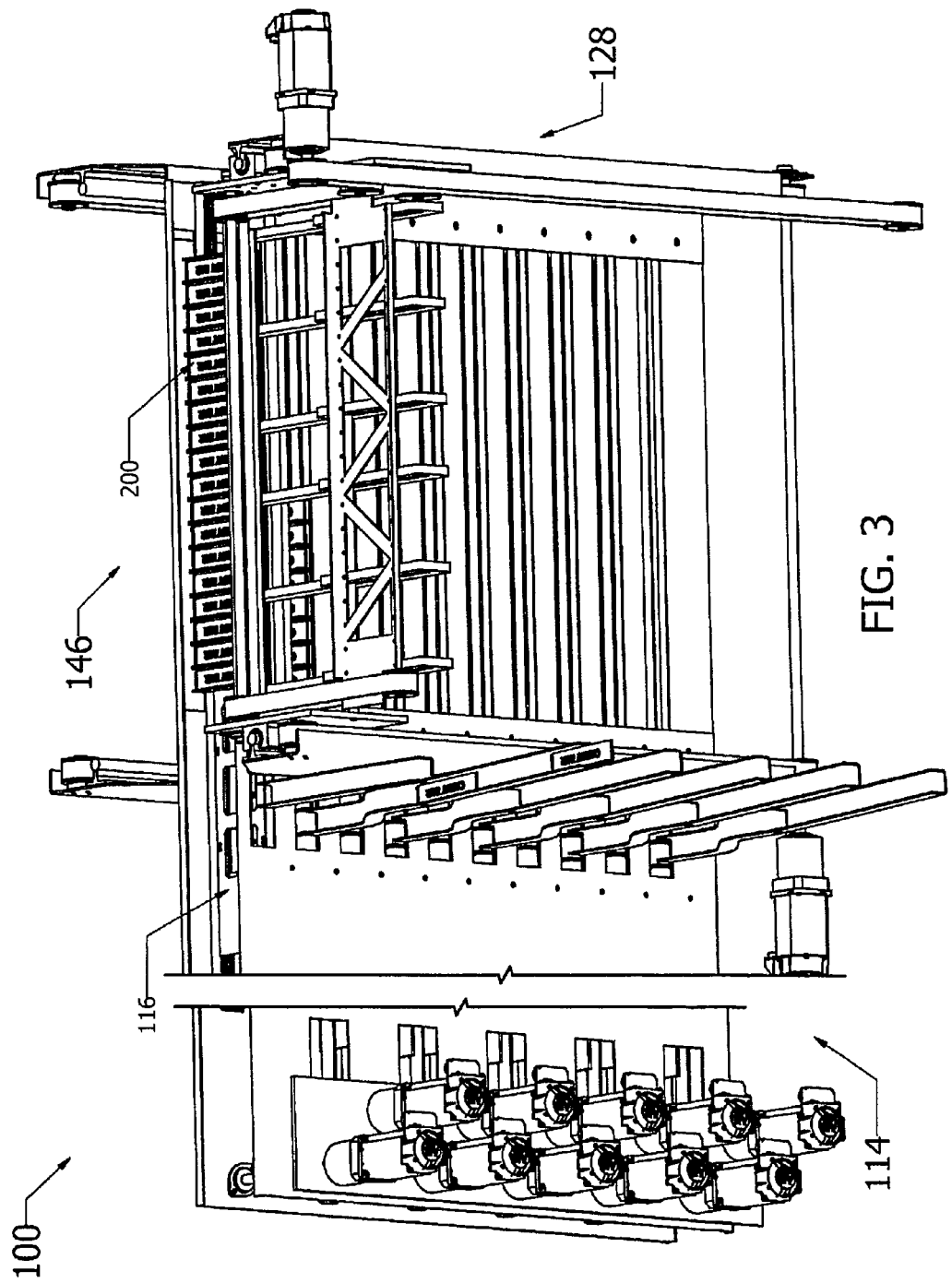
FIG. 3 is an isometric view of the product aggregating apparatus, wherein a load of product is available in a product receiver carriage, and is therefore in position to be moved to the aggregated product carriage of the aggregated product receiver assembly.

FIG. 3 shows a view of the product aggregating apparatus 100, wherein a load of product is available in the product receiver carriage 116 with the highest elevation within the product receiver assembly 114. Accordingly, the product items 200 carried by the product receiver carriage 116 are in position to be moved to the carriage 148 (not shown) of the aggregated product receiver assembly 146 (not shown). However, the carriage 148 (not shown) has not yet been positioned.

FIG. 4 shows the product aggregating apparatus 100 from a reverse angle. In this view, the carriage 148 of the aggregated product receiver assembly 146 is in position and has received the load of product items 200. The pusher carriage 130 of the pusher assembly 128 has nearly completed performing its function of pushing the product items 200 out of the product receiver carriage 116 and into the aggregated product carriage 148 of the aggregated product receiver assembly 146. When the product items have fully advanced from the product receiver carriage 116 into the carriage 148 of the aggregated product receiver assembly 146, they are shown in contact with a stop 160, which prevent their continued forward movement. The stop 160 "registers" the product items into an "aggregated" configuration, in that the product items are all fully situated in the carriage 148 of the aggregated product receiver assembly 146, and an imaginary line passing through a front portion of each product item would be straight and parallel to an imaginary line passing through a rear portion of each product item.

The carriage 148 of the aggregated product receiver assembly 146 is configured to transport a number of product items that is the same as to the number of product items contained by the product receiver carriages 116. The carriage 148 defines product item locations 152 (best seen in FIG. 4 Detail B), or holders, that are defined by small separation walls 154.

The carriage 148 is moveable in a vertical direction, so that it may be moved into a position adjacent to the vertically stacked product receiver carriages 116 of the product receiver assembly 114. The vertical adjustment motor 156 and vertical adjustment drive belt 158 are seen on the right side of the aggregated product receiver assembly 146, and allow the elevation of the carriage 148 to be adjusted.

Figure 5:
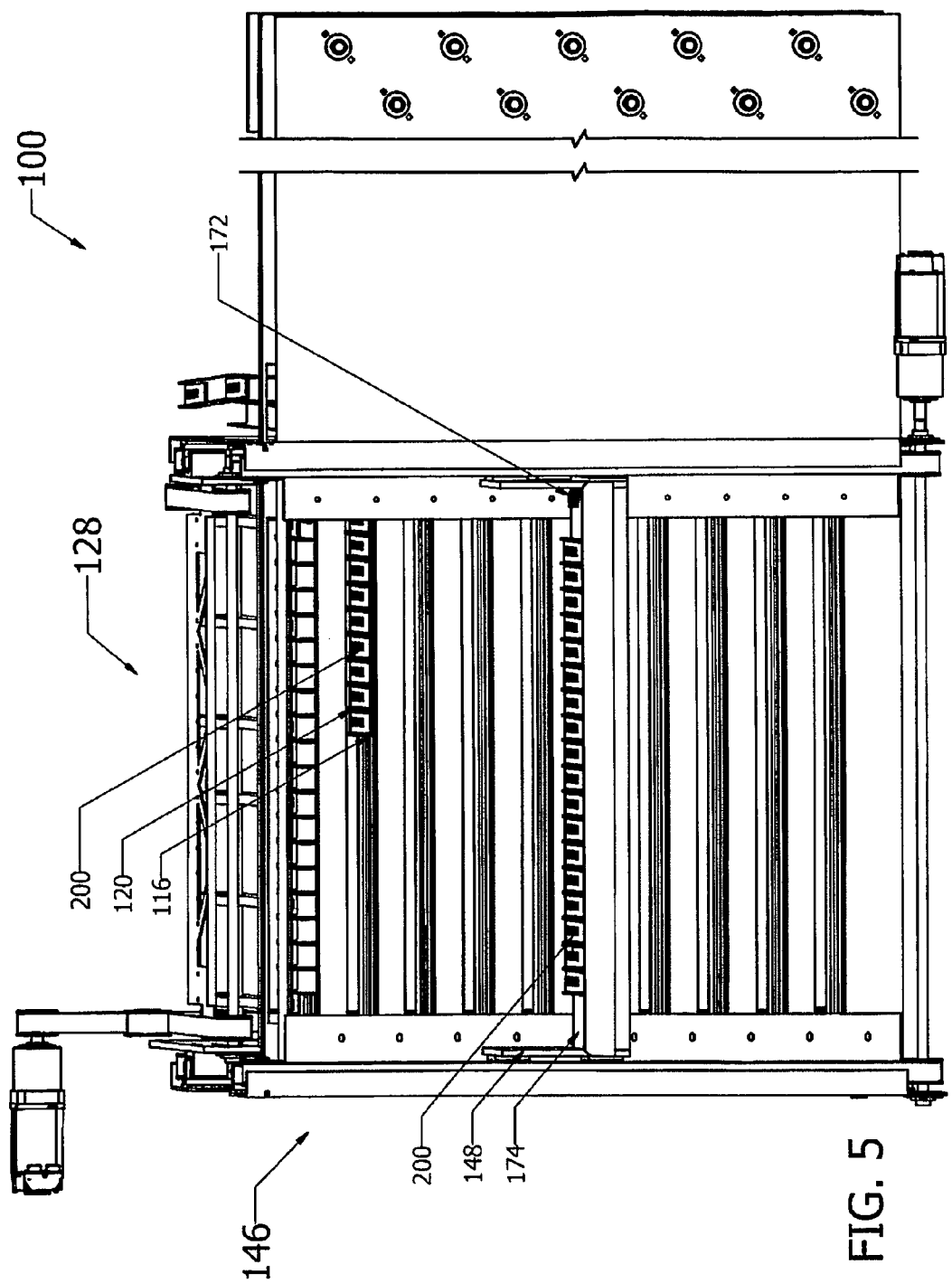
FIG. 5 is an orthographic view of the product aggregating apparatus, showing the aggregated product carriage of the aggregated product assembly moved to a selected elevation, from which the aggregated product can be conveniently removed by a product picking and placing tool (not shown).

FIG. 5 shows the product aggregating apparatus 100, wherein the aggregated product carriage 148 of the aggregated product receiver assembly 146 has moved to a mid-point elevation. The mid-point elevation is representative of possible elevations from which the product 200 which has been aggregated on the carriage 148 can be conveniently removed by a product picking and placing tool (not shown). The mid-point location illustrated by carriage 148 is convenient because it requires less vertical travel, on average, from any given elevation wherein product was transferred from a product receiver carriage 116. By selecting such a vertical elevation/location for the carriage 148 to move to, after receiving product, the product picking and placing tool can pick product from a desirable, convenient or planned location. In an alternative, the carriage 148 can allow the product picking and placing tool to pick the product immediately after it is placed on the carriage 148, without moving the carriage to a standard location. This requires the product picking and placing tool to pick product from a plurality of locations, rather than a single location. However, it reduces the burden on the carriage 148 to move vertically.

FIG. 5 shows the carriage 148 of the aggregated product receiver assembly 146 waiting for a product picker (not shown) to pick the product carried by the carriage 148. If the product picker fails to pick one or more product items, and those product items are left behind on the carriage 148, a problem may result. However, a sensor 172 (also seen in FIG. 4 Detail B) detects whether a product item is left behind after the product picker removes the product from the carriage 148 of the aggregated product receiver assembly 146. If one or more product items are left behind, i.e. not picked by the product picker, then a trap door 174 (upon which the product items are supported, within the aggregated product receiver assembly) is opened, allowing the left-behind product item(s) to drop into a bucket, bin or other container. The trap door 174 is also seen in FIG. 4, and is the surface onto which the product items 200 are sliding, as moved by the pusher carriage 128.

FIG. 5 also shows one product receiver carriage 116 which is in the process of moving horizontally and receiving one product item each in each of its item locations 120. Note that the one product receiver carriage shown to be in the process of receiving product is representative of several product receiver carriages which could receive product simultaneously, and that half of the product receiver carriages 116 may be receiving product items at any given time.

FIG. 6 is an orthographic view of the product aggregating apparatus 100 of FIG. 1A. In this view, a product receiver carriage 116 has received a single product item 200 from an in-feed conveyor 104.

FIG. 7 is an orthographic view showing the product aggregating apparatus 100 of FIG. 6 at a somewhat later time, wherein the product receiver carriage 116 is half full of product items 200. Thus, each product item 200 moved along the in-feed conveyor 104 was received in sequence by product item locations (holders) 120 within the product receiver carriage 116.

FIG. 8 is an orthographic view showing the product aggregating apparatus 100 of FIG. 7 at a still later time, wherein the receiver carriage 116 is now full of product items 200 received in sequence from the in-feed conveyor 104. At this time, the in-feed conveyor 104 that has filled the now-full product receiver carriage 116 is shifted to begin to fill a second, initially empty, product receiver carriage.

FIG. 9 is an orthographic view showing the product aggregating apparatus 100 of FIG. 8 at a still later time, wherein the product receiver carriage 116 has moved to a transfer position, from which location product items 200 will be transferred from the product receiver carriage 116 to the carriage 148 of an aggregated product receiver assembly 146, typically after earlier-filled product receiver carriages and before later-filled product receiver carriages.

Figure 10:
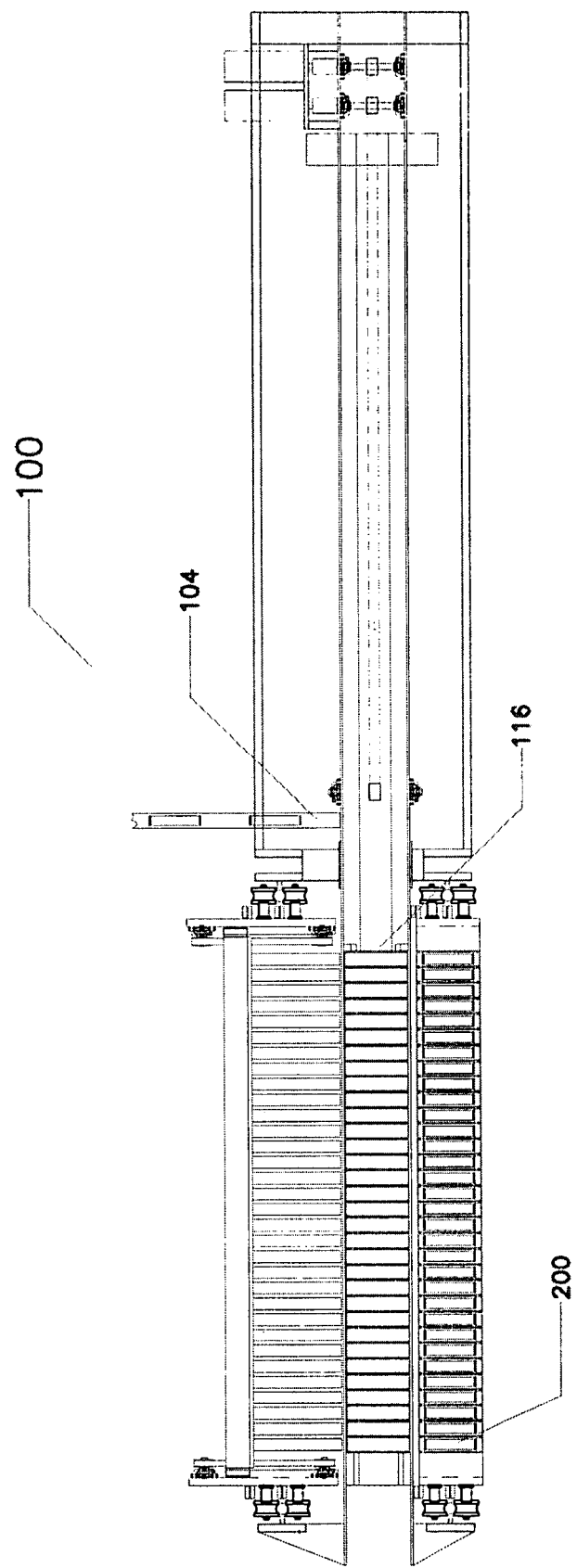
FIG. 10 is an orthographic view showing the product aggregating apparatus of FIG. 9 at a still later time, at which time the product items have been removed from the product receiver carriage and the product receiver carriage is about to return to a position at which it will receive a first product item.

FIG. 10 is an orthographic view showing the product aggregating apparatus 100 of FIG. 9 at a still later time, at which time the product items 200 have been removed from the product receiver carriage 116 and the product receiver carriage is about to return to a position at which it will receive a first product item 200 from an in-feed conveyor 104.

Example Method of Operation

Figure 11A:
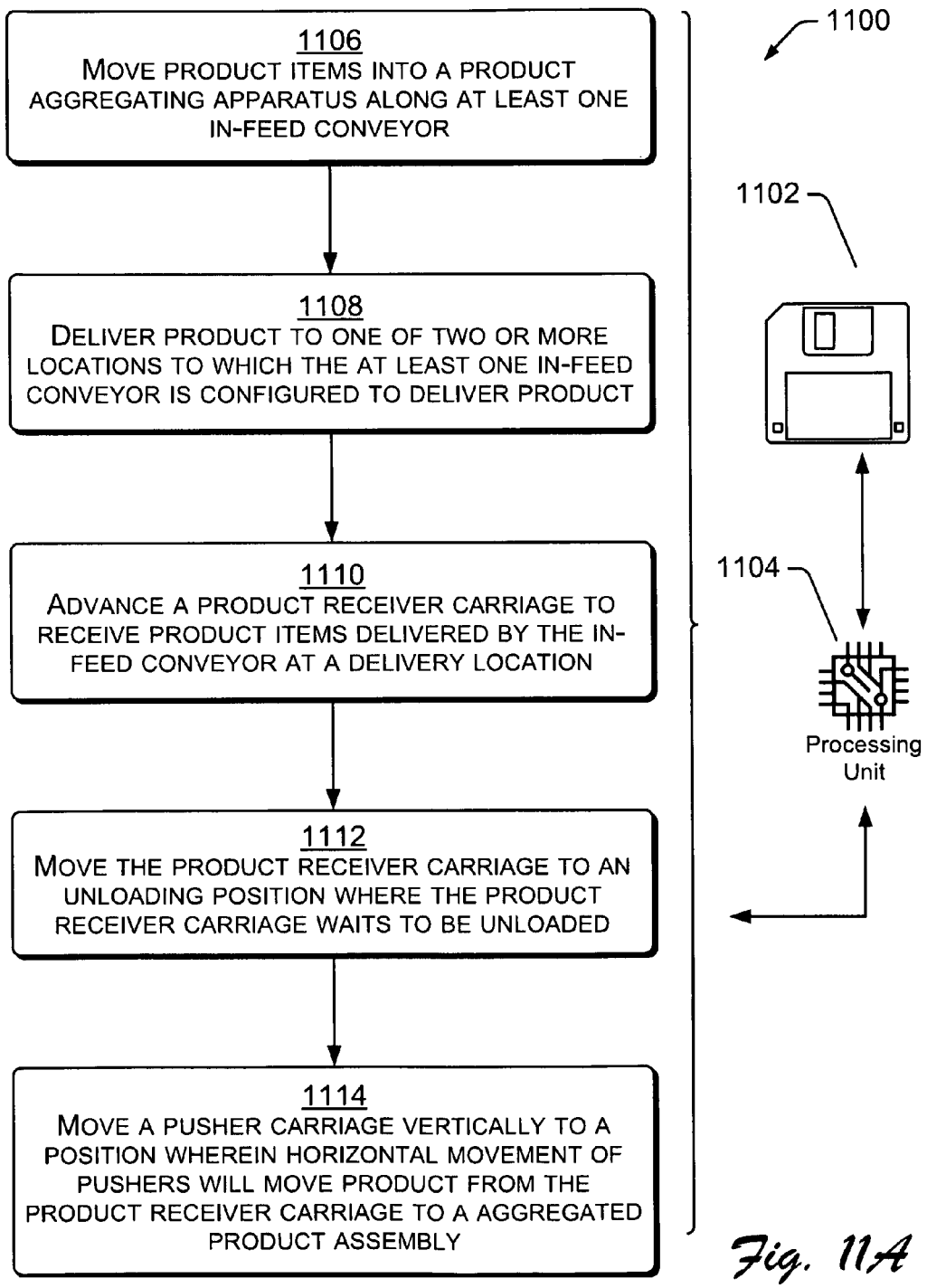

Referring to FIG. 11, a method 1100 of operating a product aggregating apparatus is shown. The method is intended to be representative of the technology taught, and is not intended to describe actions or structures that are required for operation. The method can be implemented on a computer and/or similar processor-configured device 1104, and in such an environment suitable instructions would be defined on a memory device 1102. At block 1106, product items are moved into a product aggregating apparatus along one or more in-feed conveyor assemblies. As one example of block 1106, FIG. 1A shows product items 200 moving into a product aggregating apparatus 100, moved by an in-feed conveyor 104 of an in-feed conveyor assembly 102. Note that the rate of product item deliver of all in-feed conveyors within an in-feed conveyor assembly can be the same, or different, as desired. The rate of product delivery of an in-feed conveyor can be determined by such factors as conveyor speed and/or spacing between product items. For example, if a first in-feed conveyor delivers product more rapidly than a second in-feed conveyor, then the two product receiver carriages to which the first in-feed conveyor delivers product will have to be emptied more often than the product receiver carriages to which the second in-feed conveyor delivers product.

At block 1108, product moving along an in-feed conveyor is directed to one of two or move delivery locations to which the in-feed conveyor is configured to deliver product. In a typical embodiment, an in-feed conveyor is configured to deliver product to first and second delivery locations that are associated with first and second product receiver carriages. Thus, product items are delivered to the first delivery location until the first product receiver carriage is filled, after which the in-feed conveyor diverts product to the second delivery location associated with the second product receiver carriage and that carriage begins to fill. As an example of block 1108, FIG. 1A shows a conveyor assembly 102 comprising an in-feed conveyor 104 that is hinged to allow the angle of the conveyor to be adjusted to deliver product items to the first or second delivery locations. The angle of the conveyor 104 can be adjusted by operation of a controller 1104, which operates a motor 168 to turn the wheel or crank 166 attached to a support or linkage 164 thereby supporting a portion of the in-feed conveyor at an angle and elevation to deliver product items to the desired location, and therefore to the desired product receiver carriage.

At block 1110, a product receiver carriage is advanced to receive product items moving through a conveyor. As an example of block 1110, FIG. 1B shows a product receiver carriage 116 of a product receiver assembly 114 moving to the right to accept a series of product items 200 (shown in FIG. 5) into holders 120 defined on the carriage 116. The movement may be "stop and go," in that the carriage advances by the width of a holder 120 and stops, until a holder adjacent to the conveyor end receives a product item, and then the carriage 116 advances again. The movement may be at a uniform speed, or non-stopping variable speed, allowing the product items to shoot into the holders when the holders are aligned with the conveyor end. The movement may be at a selected and/or varying speed, conducive to moving product items from an in-feed conveyor into product item holder locations 120. Such a speed may be calculated by any appropriate processor or programming, and controlled by any desired motor, servo motor, stepper motor or alternative mechanical power source.

At block 1112, once the product receiver carriage is filled with product items, the product receiver carriage is moved horizontally to an unloading position, wherein the product receiver carriage waits to be emptied by a product picking device. In a typical embodiment or application, product receiver carriages are unloaded by the aggregated product receiver assembly in the order in which they were filled. As an example of block 1112, FIG. 3 shows a product receiver carriage 116 (located on the vertically highest position) that is full of product items 200 and waiting to be emptied. Additionally, FIG. 9 shows that the product receiver carriage has moved to an unloading or transfer position, from which location a pusher assembly (not shown) will remove the product items from the receiver carriage, typically after earlier-filled carriages and before later-filled carriages. While the product receiver carriage waits to be emptied, it does not move horizontally. (In the example discussed, product receiver carriages do not move vertically.)

At block 1114, a pusher carriage of a pusher assembly moves vertically to a position adjacent to a product receiver carriage to be emptied. At that vertical location, horizontal movement of a pusher will move product from the product receiver carriage to a carriage of an aggregated product receiver. As an example of block 1114, FIG. 4 shows the pushers 142 of the pusher carriage 130 of the pusher assembly 128 in position to push product off the upper product receiver carriage 116 and onto the carriage 148 of the aggregated product receiver assembly 146.

At block 1116, a carriage of an aggregated product receiver assembly moves vertically into position to receive product pushed from a product receiver carriage. As an example of block 1116, FIG. 4 shows the carriage 148 of the aggregated product receiver assembly 146 has moved in a vertical manner to the upper location and has received product 200 transferred from the upper product receiver carriage 116.

At block 1118, a pusher or plunger transfers or pushes product from a product receiver carriage (on which product items were received one at a time from the conveyor assembly) to a carriage of an aggregated product receiver assembly, thereby emptying the product receiver carriage. As an example of block 1118, FIG. 4 shows the pusher 142 of carriage 130 pushing product 200 from the product receiver carriage 116 and onto the carriage 148 of the aggregated product receiver assembly 146.

At block 1120, the carriage of the aggregated product receiver assembly moves to a vertical elevation anticipated by a picking apparatus, which picks the aggregated product from the carriage of the carriage of the aggregated product receiver assembly. As an example of block 1120, FIG. 5 shows the carriage 148 of the aggregated product receiver assembly 146 at a middle elevation, at which it waits for the product picking apparatus (not shown) to remove the product from the carriage 148.

At block 1122, a picking apparatus picks the product from the aggregated product receiver. At block 1124, a scanner determines if the product picking apparatus has failed to pick (i.e. if it has missed) any product items. If so, they are disposed of. As an example of block 1124, FIG. 4 shows that a sensor 172 is able to recognize product items that were missed by the product picker. If such an item is present, then the trap door 174 is opened, thereby disposing of that missed product item.

The process 1100 is repeated as needed, with additional product received by the in-feed conveyor assembly, additional product receiver carriages filling with that product, the pusher carriage and aggregated product receiver carriage moving adjacent to the filled product receiver carriages, the product pushed to the aggregated product receiver carriage, which is then repeatedly picked by a picking tool, as appropriate.

CONCLUSION

The preceding discussion was directed to an example of a product aggregating apparatus and method by which it is operated. While one example was discussed in detail, other product handling devices, having a structure and method of operation differing in some characteristics to the discussion above, would still be in keeping with the spirit, teachings and claimed subject matter. Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. A method of aggregating product, comprising:
moving product items into a product aggregating apparatus along an in-feed conveyor;
advancing a first product receiver carriage to receive product items delivered by the in-feed conveyor at a delivery location, thereby filling product item holders in the first product receiver carriage;
moving the product receiver carriage to an unloading position;
moving a pusher carriage vertically to a position wherein horizontal movement of a pusher from the pusher carriage will empty the first product receiver carriage;
pushing product from the first product receiver carriage to an aggregated product receiver carriage; and
moving the aggregated product receiver carriage to a location anticipated by a picking apparatus.

2. The method of claim 1, additionally comprising:
adjusting an angle of the in-feed conveyor to deliver product to a second product receiver carriage; and
advancing the second product receiver carriage to receive product items delivered by the in-feed conveyor while the first product receiver carriage is at the unloading position.

3. The method of claim 1, additionally comprising:
diverting product moving along the in-feed conveyor to send product to a second product receiver carriage; and
unloading the first product receiver carriage while the second product receiver carriage is filling with product.

4. The method of claim 1, wherein pushing product from the first product receiver carriage to the aggregated product receiver carriage comprises:
extending the pusher from a pusher carriage to push product items in the product item holders onto the aggregated product receiver carriage.

5. The method of claim 1, wherein moving product items into the product aggregating apparatus along an in-feed conveyor comprises:
alternating between moving a number of product items to the first product receiver carriage and moving the number of product items to a second product receiver carriage; and moving items into the product aggregating apparatus along two in-feed conveyors, wherein the two in-feed conveyors deliver product at different rates.

6. The method of claim 1, additionally comprising:
scanning for product missed by the picking apparatus; and disposing of any product detected by the scanning.

7. A method of aggregating product, comprising:
moving product items along an in-feed conveyor, wherein the moving alternately fills a first product receiver carriage and then a second product receiver carriage;
advancing the first product receiver carriage to receive product items delivered by the in-feed conveyor at a delivery location, thereby filling product item holders in the first product receiver carriage;
moving the first product receiver carriage to an unloading position;
moving the second product receiver carriage to a loading position, wherein the in-feed conveyor delivers product items to product item holders in the second product receiver carriage;
pushing product from the first product receiver carriage to an aggregated product receiver carriage;
moving the aggregated product receiver carriage to a location anticipated by a picking apparatus.

8. The method of claim 7, additionally comprising:
adjusting an angle of the in-feed conveyor to deliver product to the second product receiver carriage; and
advancing the second product receiver carriage to receive product items delivered by the in-feed conveyor while the first product receiver carriage is at the unloading position.

9. The method of claim 7, wherein pushing product from the first product receiver carriage to the aggregated product receiver carriage comprises:
extending a pusher from a pusher carriage to push product items in the product item holders onto the aggregated product receiver carriage.

10. The method of claim 7, wherein moving product items along the in-feed conveyor comprises:
alternating between moving a number of product items to the first product receiver carriage and moving the number of product items to the second product receiver carriage.

11. The method of claim 7, additionally comprising:
scanning for product missed by the picking apparatus; and disposing of any product detected by the scanning.

12. A method of aggregating product, comprising:
moving product items along an in-feed conveyor, wherein the moving alternately adds product to a first product receiver carriage and then to a second product receiver carriage;
unloading the second product receiver carriage while the first product receiver carriage is filling with product;
moving the first product receiver carriage to an unloading position;
moving the second product receiver carriage to a loading position, wherein the in-feed conveyor delivers product items to product item holders in the second product receiver carriage;
unloading the first product receiver carriage to an aggregated product receiver carriage while the second product receiver carriage is filling with product; and
removing product from the aggregated product receiver carriage.

13. The method of claim 12, additionally comprising:
adjusting an angle of the in-feed conveyor to deliver product to the second product receiver carriage.

14. The method of claim 12, wherein unloading the first product receiver carriage to the aggregated product receiver carriage comprises:
extending a pusher from a pusher carriage to push product items in the product item holders onto the aggregated product receiver carriage.

15. The method of claim 12, wherein moving product items along the in-feed conveyor comprises:
alternating between moving a number of product items to the first product receiver carriage and moving the number of product items to a second product receiver carriage.

16. The method of claim 12, additionally comprising:
scanning for product missed by the picking apparatus; and disposing of any product detected by the scanning.

* * * * *